United States Patent
Su et al.

(10) Patent No.: US 9,618,975 B2
(45) Date of Patent: Apr. 11, 2017

(54) RETRACTABLE DISPLAY APPARATUS AND PORTABLE ELECTRONIC DEVICE USING THE SAME

(71) Applicant: Chiun Mai Communication Systems, Inc., New Taipei (TW)

(72) Inventors: Kao-Kuan Su, New Taipei (TW); Min-Sheng Wang, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 14/849,778

(22) Filed: Sep. 10, 2015

(65) Prior Publication Data

US 2016/0154433 A1 Jun. 2, 2016

(30) Foreign Application Priority Data

Nov. 28, 2014 (CN) .......................... 2014 1 0700377

(51) Int. Cl.
*G06F 1/16* (2006.01)

(52) U.S. Cl.
CPC .......... *G06F 1/1652* (2013.01); *G06F 1/1626* (2013.01)

(58) Field of Classification Search
CPC ............................. G06F 1/1652; G06F 1/1656
See application file for complete search history.

(56) References Cited

U.S. PATENT DOCUMENTS

| 7,667,962 | B2* | 2/2010 | Mullen | G06F 1/1624 |
| | | | | 359/461 |
| 7,786,951 | B2* | 8/2010 | Huitema | G06F 1/1601 |
| | | | | 345/1.1 |
| 8,064,962 | B2* | 11/2011 | Wilcox | G06F 1/1601 |
| | | | | 455/550.1 |
| 8,380,327 | B2* | 2/2013 | Park | G05B 11/01 |
| | | | | 29/592.1 |
| 2004/0183958 | A1* | 9/2004 | Akiyama | G09F 9/30 |
| | | | | 349/58 |
| 2007/0241002 | A1* | 10/2007 | Wu | G06F 1/1601 |
| | | | | 206/150 |
| 2015/0029229 | A1* | 1/2015 | Voutsas | G06F 1/1652 |
| | | | | 345/661 |

* cited by examiner

*Primary Examiner* — Anthony Q Edwards
(74) *Attorney, Agent, or Firm* — Steven M. Reiss

(57) ABSTRACT

A retractable display apparatus includes a display assembly and a retraction assembly. The retraction assembly includes an accommodation assembly, a rotary member, a driving assembly, and a latching member. The rotary member is received in the accommodation assembly and is coupled to the display assembly. The driving assembly is rotatably received in the rotary member, fixed to the rotary member and secured by the accommodation assembly. The latching member detachably latches the rotary member onto the accommodation assembly. The rotary member drives the driving assembly to rotate, and the driving assembly accumulates potential energy for reversely rotating the rotary member, for extending or rolling the display assembly.

15 Claims, 7 Drawing Sheets

RETRACTABLE DISPLAY APPARATUS AND PORTABLE ELECTRONIC DEVICE USING THE SAME

FIELD

The subject matter herein generally relates to retractable display apparatus, and particularly to a retractable display apparatus for a portable electronic device with a retracted configuration and an extended configuration.

BACKGROUND

The popularity of portable electronic devices, such as cellular telephones, personal data assistants (PDAs), etc., continues to increase each year. To maintain this trend, manufacturers continue to explore ways to make the portable electronic devices appeal to a larger percentage of the population. One area of focus involves deployable displays because the deployable display may expand an output interface of the portable electronic devices.

BRIEF DESCRIPTION OF THE DRAWINGS

Implementations of the present technology will now be described, by way of example only, with reference to the attached figure.

DETAILED DESCRIPTION

Figure 1:
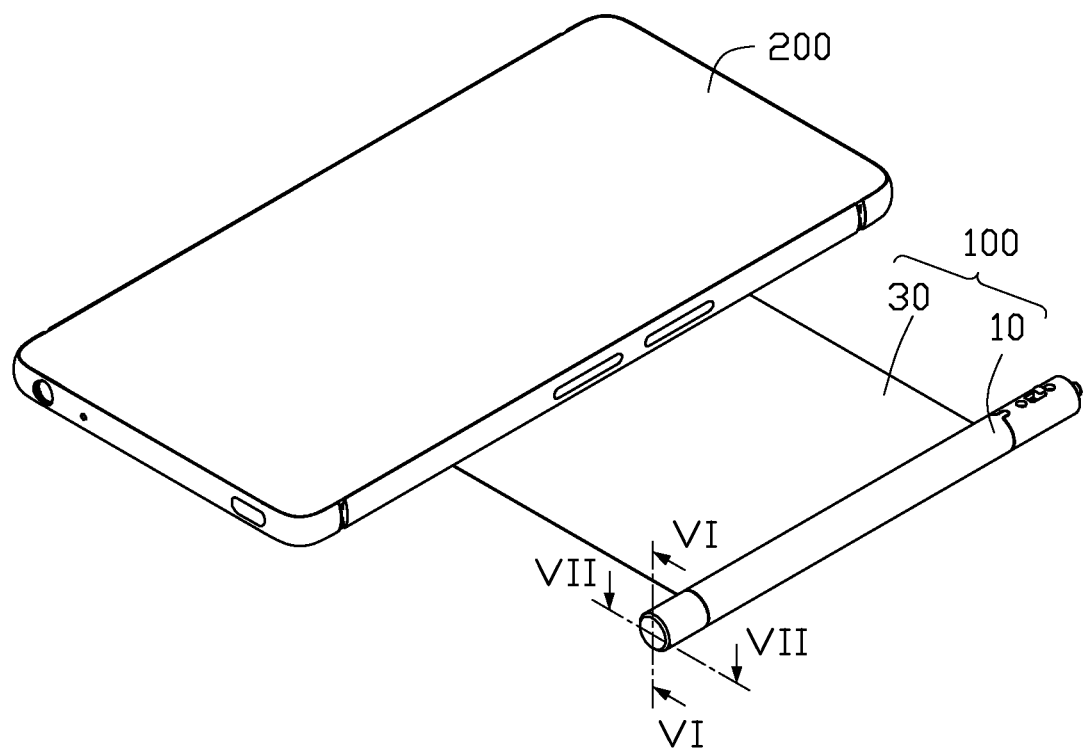
FIG. 1 is an assembled, isometric view of a portable electronic device employing a retractable display apparatus in an extended configuration according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a retractable display apparatus and a portable electronic device using the same.

Figure 5:
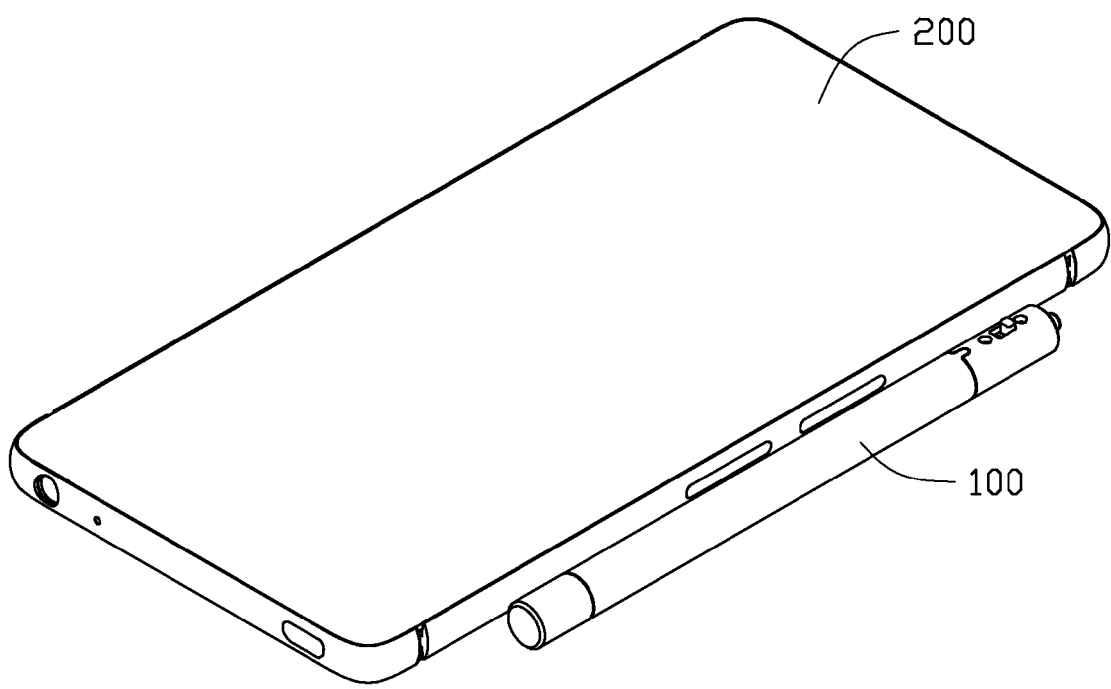
FIG. 5 is an assembled, isometric view of the portable electronic device of FIG. 1 in a retracted configuration.

FIG. 1 and FIG. 5 illustrate a retractable display apparatus 100, according an exemplary embodiment. The retractable display apparatus 100 is employed in a portable electronic device 200. The portable electronic device 100 can be a mobile phone, a personal data assistant (PDA), a tablet, or an intelligent watch, for example (details not shown).

Figure 2:
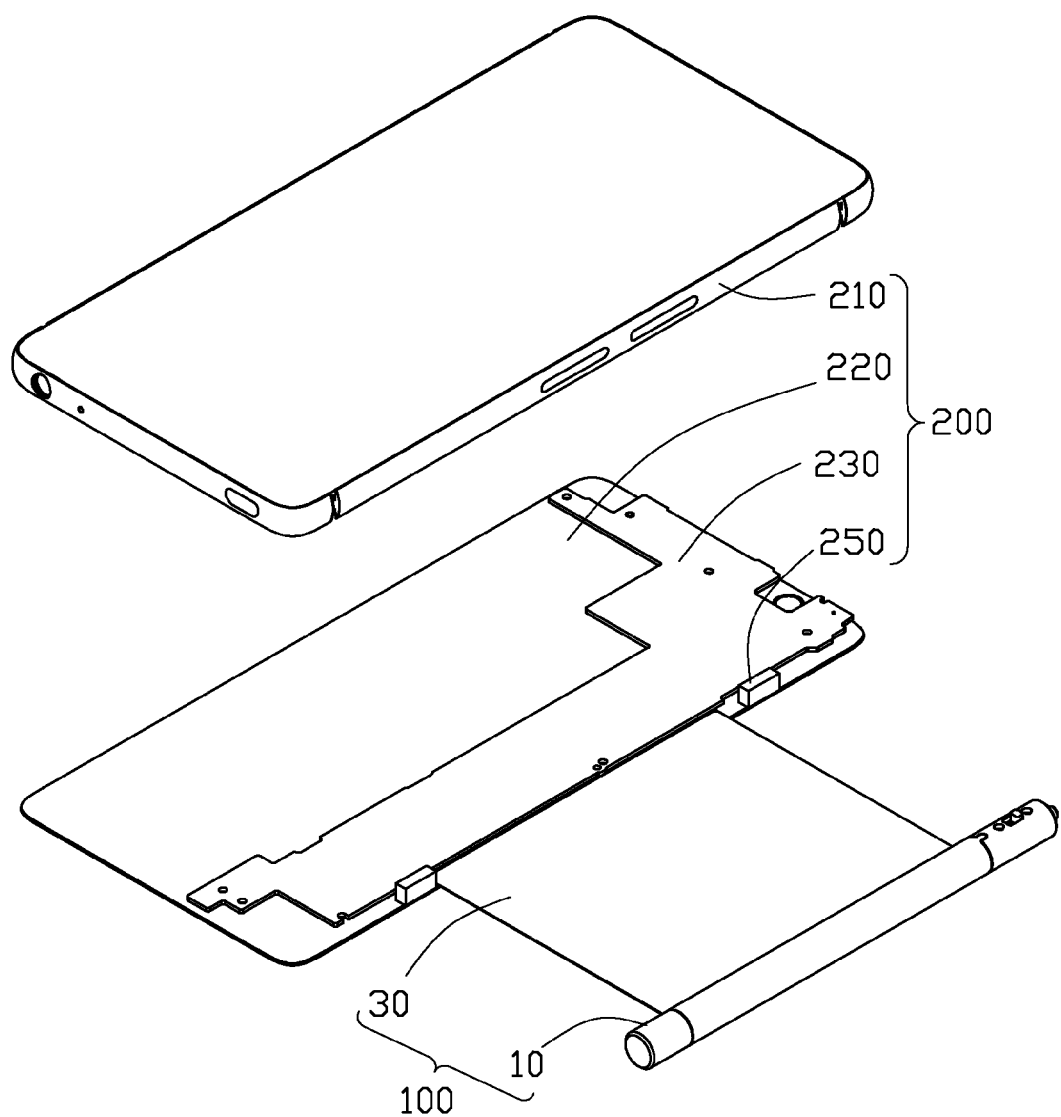
FIG. 2 is a partially exploded, isometric view of the portable electronic device of FIG. 1.

FIG. 2 illustrates that the portable electronic device 200 further includes a housing 210, a holding plate 220, a printed circuit board (PCB) 230, and at least one magnet 250. The holding plate 220 is received in an interior space of the housing 210. The PCB 230 is disposed on the holding plate 220 and is electronically coupled to the retractable display apparatus 100. The at least one magnet 250 is mounted on a side of the holding plate 220 to attract the retractable display apparatus 100.

Figure 3:
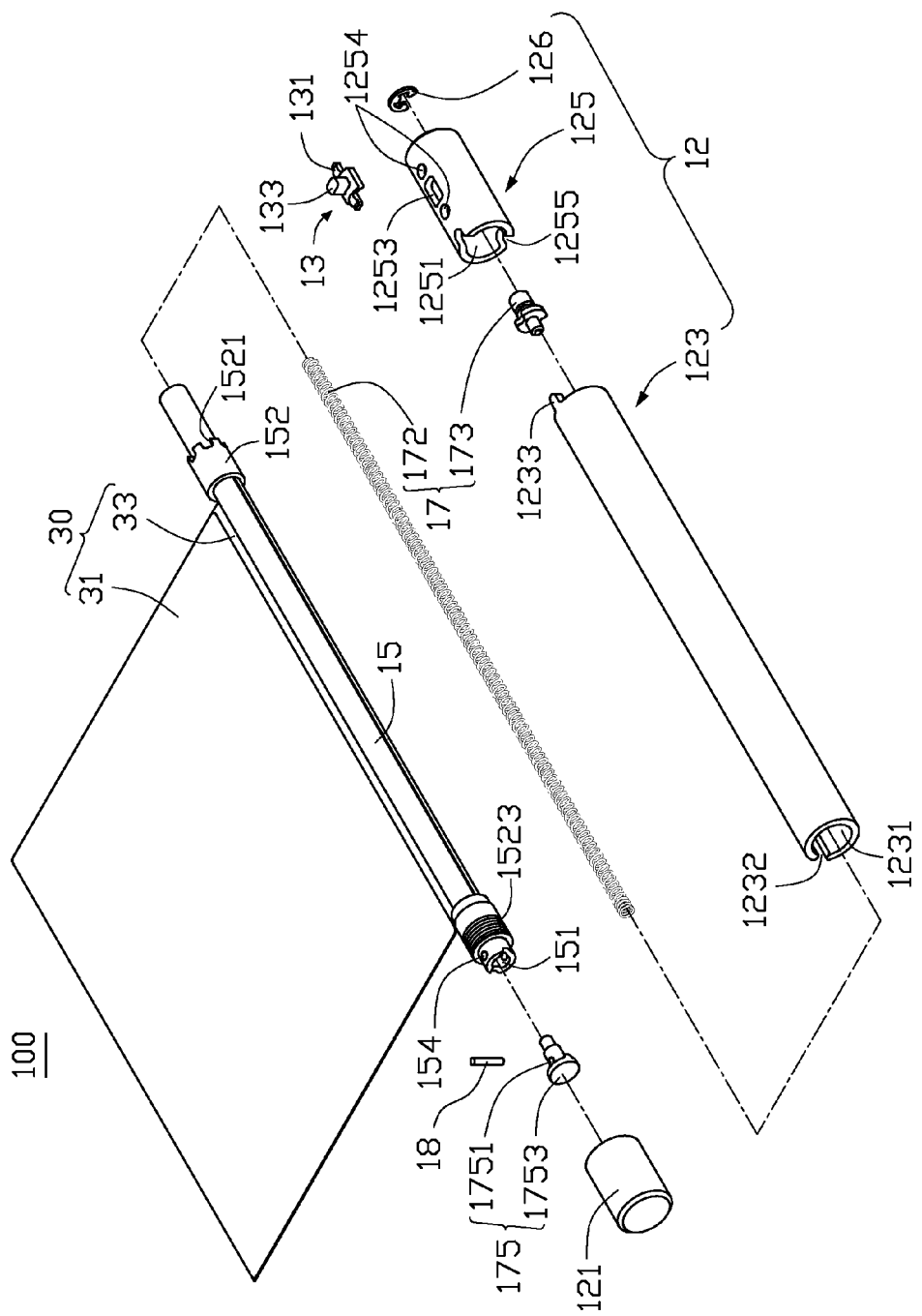
FIG. 3 is an exploded, isometric view of the retractable display apparatus of FIG. 1.
Figure 4:
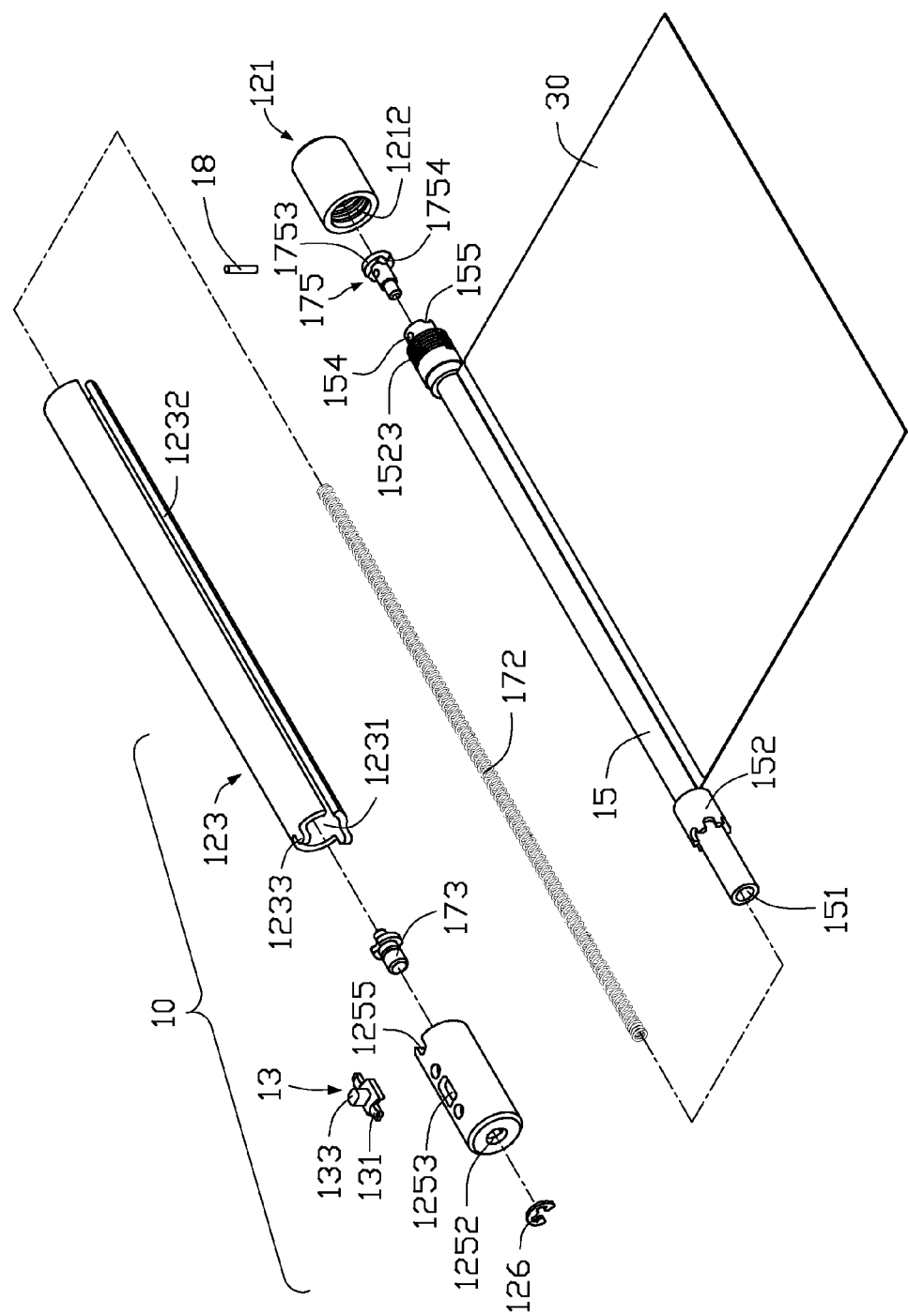
FIG. 4 is similar to FIG. 3, but shown from another angle.

FIG. 3 and FIG. 4 illustrate that the retractable display apparatus 100 includes a retraction assembly 10 and a display assembly 30. The display assembly 30 is connected between the PCB 230 and the retraction assembly 10, and can be withdrawn from and retracted into the retraction assembly 10. In detail, the display assembly 30 includes a deployable display 31 and a reinforce sheet 33. The deployable display 31 can be a flexible display, the deployable display 31 is attached on the reinforce sheet 33 and is electronically coupled to the PCB 230, thereby serving as a display of the portable electronic device 200. The reinforce sheet 33 can be made of flexible materials, such as plastics. The reinforce sheet 33 is fixed to the retraction assembly 10, so that the display assembly 30 may be rolled onto the retraction assembly 10 in a retracted configuration and extended from the retraction assembly 10 in an extended configuration.

The retraction assembly 10 includes an accommodation assembly 12, a latching member 13, a rotary member 15, and a driving assembly 17. The accommodation assembly 12 is configured to receive the rotary member 15, the driving assembly 17, and the display assembly 30. The driving assembly 17 is rotatably received in the rotary member 15 and is rotated by the rotary member 15, and thus the driving assembly 17 accumulates potential energy for reversely rotating the rotary member 15. The latching member 13 detachably latches the rotary member 15 onto the accommodation assembly 12.

The accommodation assembly 12 includes a cap 121, a barrel 123, a locking member 125, and a washer 126. In at least one embodiment, at least one of the cap 121 and the locking member 125 can be made of metal for engaging with the at least one magnet 250, and all of the cap 121, the barrel 123, and the locking member 125 are hollow cylinders and have substantially the same diameters. The cap 121 has an open end and forms an inner screw thread 1212 therein for threadedly engaging with the rotary member 15. The barrel 123 is tubular, longitudinally defines a through hole 1231 to receive the rotary member 15. In addition, a slit 1232 is defined on a peripheral wall of the barrel 123, the slit 1232 has generally the same length as the through hole 1231, so the slit 1232 can be communicated with the through hole 1231 to allow the display assembly 30 to pass through. A first end of the barrel 123 resists the cap 121, and a second end of the barrel 123 has a plurality of protrusions 1233 to engage with the locking member 125. The washer 126 can be O-shaped (i.e. disk shaped with a circular hole) or C-shaped and is fixed on the driving assembly 17. Detail descriptions will be illustrated below.

The locking member 125 longitudinally defines a chamber 1251 for partially receiving the rotary member 15. The locking member 125 includes a bottom wall defining a retaining hole 1252, and the retaining hole 1252 communicates with the chamber 1251 for firmly retaining the driving assembly 17. Additionally, a mounting hole 1253 and two latching holes 1254 are defined on a peripheral wall of the locking member 125 to mount the latching member 13. In at least one embodiment, the two latching holes 1254 are respectively disposed at two sides of the mounting hole 1253. The locking member 125 further defines a plurality of latching slots 1255 recessed in one end thereof to latch the plurality of protrusions 1233 to facilitate engagement of the barrel 123 and the locking member 125.

The latching member 13 is configured to detachably latch with the locking member 125 and the rotary member 15. In detail, the latching member 13 includes two latching portions 131 and an operating portion 133. The latching member 13 is slidably received in the chamber 1251 of the locking member 125, thus, the two latching portions 131 respectively pass through the two latching holes 1254 and detachably latch with the rotary member 15, and the operating portion 133 is exposed from and slidably received in the mounting hole 1253.

The rotary member 15 can be rotatably accommodated in the through hole 1231 of the barrel 123. The rotary member 15 longitudinally defines an accommodation hole 151 to receive the driving assembly 17. In addition, the rotary member 15 integrally forms two latching rings 152 at two opposite ends. In other embodiments, the two latching rings 152 can be detachably fixed to the rotary member 15. One of the two latching rings 152 circularly defines a plurality of engaging slots 1521 spaced from each other, and the plurality of engaging slots 1521 is configured to latch the latching portion 131 to secure the rotary member 15 onto the locking member 125. Another latching ring 152 forms an outer screw thread 1523 thereon for threadedly engaging with the inner screw thread 1212 of the cap 121. Further, the rotary member 15 defines two mounting holes 154 and a gap 155 adjacent to the outer screw thread 1523, and both the two mounting holes 154 and the gap 155 are configured to engage with the driving assembly 17.

The driving assembly 17 includes an urging member 172, a fixing member 173, and a resisting member 175. The urging member 172 passes through the accommodation hole 151. The fixing member 173 and the resisting member 175 are fixed to two opposite ends of the urging member 172, respectively. A distal end of the fixing member 173 is exposed from the retaining hole 1252 and is secured by the washer 126. The resisting member 175 defines a pin hole 1751 corresponding to the two mounting holes 154 of the rotary member 15. Additionally, the resisting member 175 forms a flange 1753 away from the urging member 172, and a plurality of resisting portions 1754 are protruded from the flange 1753 to engage with the gap 155 of the rotary member 15.

In assembly, referring to FIGS. 2-5, the urging member 172 is passed through the accommodation hole 151 and is connected between the fixing member 173 and the resisting member 175. The resisting portions 1754 are latched into the gap 155, and a pin 18 is inserted in to the pin hole 1751 and the two mounting holes 154. Thus, the urging member 172 is fixed to the rotary member 15.

The reinforce sheet 33 is attached to the rotary member 15, and then the rotary member 15 is received in the through hole 1231. Then, the display assembly 30 is rolled onto the rotary member 15 in the retracted configuration and is partially exposed from the slit 1232 for electronically coupled to the PCB 230.

The cap 121 is screwed to a first end of the rotary member 15 and resists the barrel 123. The locking member 125 is mounted to a second end of the rotary member 15 to allow the plurality of protrusions 1233 to be latched by the plurality of latching slots 1255. The fixing member 173 passes through the retaining hole 1252 and is secured by the washer 126. Thus, the fixing member 173 is fixed to the locking member 125. The latching member 13 is slidably received in the chamber 1251, one of the two latching portions 131 is positioned adjacent to the plurality of engaging slots 1521, and the operating portion 133 is exposed from the mounting hole 1253. In an initial state, the two latching portions 131 are disengaged from the plurality of engaging slots 1521, and the retractable display apparatus 100 is attracted by the magnet 250.

Figure 6:
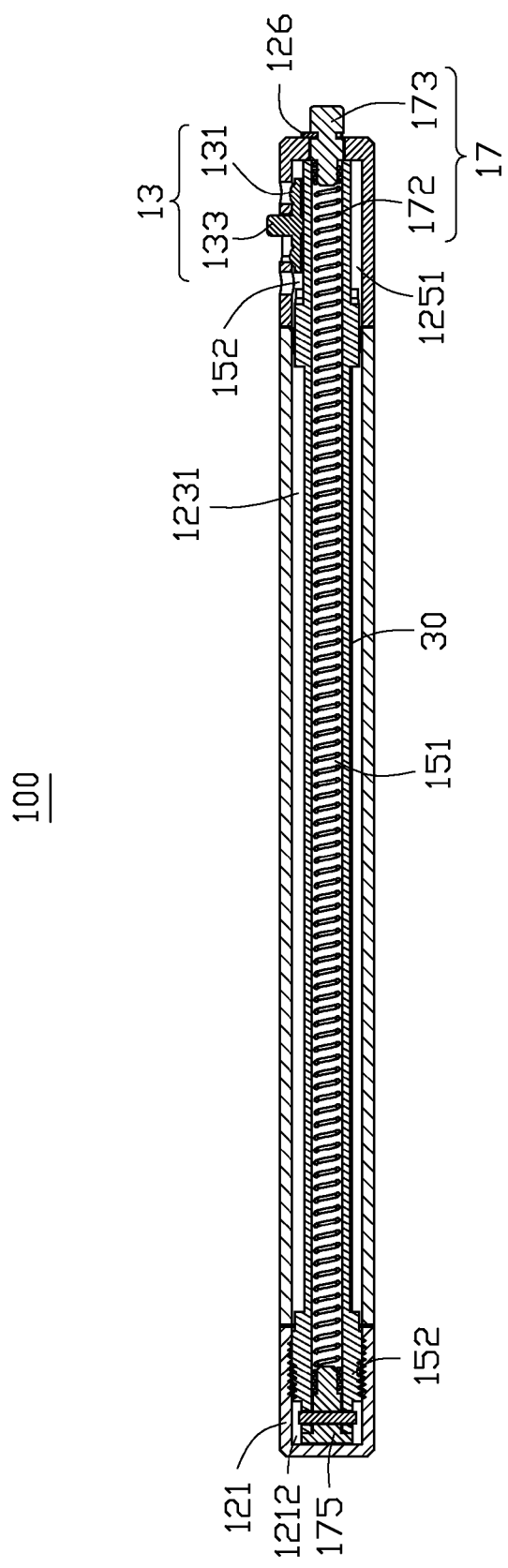
FIG. 6 is a cross-sectional view taken along line VI-VI of FIG. 1.
Figure 7:
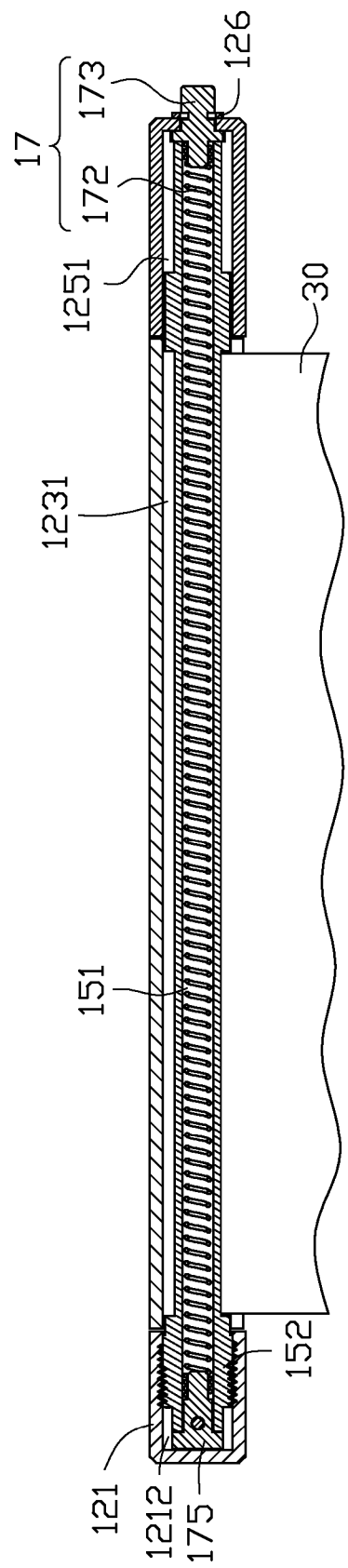
FIG. 7 is a cross-sectional view taken along line VII-VII of FIG. 1.

Also referring to FIGS. 6-7, in use, a user may pull on the barrel 123 to extend the display assembly 30, thereby rotating the rotary member 15 and the cap 121. Since the urging member 172 is fixed to the rotary member 15 and the locking member 125, the urging member 172 is driven by the rotary member 15, and thus the urging member 172 is twisted and accumulates potential energy because of a resistance of the locking member 125.

When the display assembly 30 is extended from the retraction assembly 10 in the extended configuration, the latching member 13 is manipulated to move towards the barrel 123. Thus, the latching portion 131 is latched into one of the plurality of engaging slots 1521 to fix the rotary member 15 and the locking member 125. At this time, the rotary member 15 cannot rotate relative to the locking member 125, and then the display assembly 30 can serve as a human-machine interface to receive user input.

When the display assembly 30 is not in use, the latching member 13 is manipulated to move towards the washer 126 to allow the latching portion 131 to be disengaged from the latching slot 1521. At this time, the rotary member 15 reversely rotates relative to the locking member 125 by the potential energy of the urging member 172 for rolling the display assembly 30 again.

In summary, the retractable display apparatus 100 includes the retraction assembly 10 and the display assembly 30, the retraction assembly 10 includes the accommodation assembly 12, the latching member 13, the rotary member 15, and the driving assembly 17. The display assembly 30 is disposed around the rotary member 15 in the retracted configuration. The rotary member 15 drives the driving assembly 17 to rotate and accumulate potential energy, the latching member 13 latches the rotary member 15 onto the accommodation assembly 12 to ensure the display assembly 30 to be in the extended configuration. Therefore, the retractable display apparatus 100 is both efficient and convenient.

The embodiments shown and described above are only examples. Many details are often found in the art such as the other features of the retractable display apparatus and the portable electronic device using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A retractable display apparatus comprising:
a display assembly; and
a retraction assembly comprising:
an accommodation assembly;
a rotary member received in the accommodation assembly and coupled to the display assembly;
a driving assembly rotatably received in the rotary member, the driving assembly fixed to the rotary member and secured by the accommodation assembly; and
a latching member detachably latching the rotary member onto the accommodation assembly;
wherein the rotary member drives the driving assembly to rotate, and the driving assembly accumulates potential energy for reversely rotating the rotary member, for allowing the display assembly to be rolled onto rotary member in a retracted configuration and extended from the rotary member in an extended configuration;
wherein the accommodation assembly comprises a barrel, the barrel longitudinally defines a through hole to receive the rotary member, and a slit is defined on the barrel, the slit communicates with the through hole to allow the display assembly to pass through; and
wherein the accommodation assembly further comprises a locking member fixed to the barrel, the locking member defines a chamber for partially receiving the rotary member, and a retaining hole is defined on the locking member for firmly retaining the driving assembly, the retaining hole communicates with the chamber.

2. The retractable display apparatus as claimed in claim 1, wherein a mounting hole and at least one latching hole are defined on the locking member to mount the latching member, the latching member comprises an operating portion and at least one latching portion, the latching member is slidably received in the chamber of the locking member, the at least one latching portion passes through the at least one latching hole and detachably latches with the rotary member, and the operating portion is exposed from the mounting hole.

3. The retractable display apparatus as claimed in claim 2, wherein the accommodation assembly further comprises a cap, the rotary member forms two latching rings at two opposite ends, one of the two latching rings circularly defines a plurality of engaging slots to latch the at least one latching portion, another latching ring engages with the cap.

4. The retractable display apparatus as claimed in claim 1, wherein the driving assembly comprises an urging member, a fixing member, and a resisting member, the urging member passes through the rotary member, the fixing member and the resisting member are fixed to two opposite ends of the urging member, respectively.

5. The retractable display apparatus as claimed in claim 4, wherein the accommodation assembly further comprises a washer, and a distal end of the fixing member is exposed from the retaining hole and is secured by the washer.

6. The retractable display apparatus as claimed in claim 4, wherein the resisting member forms a flange, and a plurality of resisting portions are protruded from the flange to engage with a gap defined on the rotary member.

7. A portable electronic device comprising:
a printed circuit board (PCB); and
a retractable display apparatus, comprising:
a display assembly electronically coupled to the PCB; and
a retraction assembly comprising:
an accommodation assembly;
a rotary member received in the accommodation assembly and coupled to the display assembly;
a driving assembly rotatably received in the rotary member, the driving assembly fixed to the rotary member and secured by the accommodation assembly; and
a latching member detachably latching the rotary member onto the accommodation assembly;
wherein the rotary member rotates to extend the display assembly, and the driving assembly accumulates potential energy;
wherein the driving assembly reversely rotates the rotary member by the potential energy to roll the display assembly;
wherein the accommodation assembly comprises a barrel, the barrel longitudinally defines a through hole to receive the rotary member, and a slit is defined on the barrel, the slit communicates with the through hole to allow the display assembly to pass through; and
wherein the accommodation assembly further comprises a locking member fixed to the barrel, the locking member defines a chamber for partially receiving the rotary member, and a retaining hole is defined on the locking member for firmly retaining the driving assembly, the retaining hole communicates with the chamber.

8. The portable electronic device as claimed in claim 7, wherein a mounting hole and at least one latching hole are defined on the locking member to mount the latching member, the latching member comprises an operating portion and at least one latching portion, the latching member is slidably received in the chamber of the locking member, the at least one latching portion passes through the at least one latching hole and detachably latches with the rotary member, and the operating portion is exposed from the mounting hole.

9. The portable electronic device as claimed in claim 8, wherein the accommodation assembly further comprises a cap, the rotary member forms two latching rings at two opposite ends, one of the two latching rings circularly defines a plurality of engaging slots to latch the at least one latching portion, another latching ring engages with the cap.

10. The portable electronic device as claimed in claim 7 wherein the driving assembly comprises an urging member, a fixing member, and a resisting member, the urging member passes through the rotary member, the fixing member and the resisting member are fixed to two opposite ends of the urging member, respectively.

11. The portable electronic device as claimed in claim 10, wherein the accommodation assembly further comprises a washer, and a distal end of the fixing member is exposed from the retaining hole and is secured by the washer.

12. The portable electronic device as claimed in claim 10, wherein the resisting member forms a flange, and a plurality of resisting portions are protruded from the flange to engage with a gap defined on the rotary member.

13. The portable electronic device as claimed in claim 7, further comprising a housing, a holding plate, and at least one magnet, the holding plate is received in the housing for carrying the PCB, and the at least one magnet is mounted on the holding plate to attract the retractable display apparatus.

14. The portable electronic device as claimed in claim 7, the display assembly comprises a deployable display and a reinforce sheet, the deployable display is attached on the reinforce sheet and is electronically coupled to the PCB, and the reinforce sheet is fixed to the rotary member.

15. A portable electronic device with a deployable display comprising:
 a housing defining an interior space;
 a printed circuit board positioned within the defined interior housing space; and
 a retractable display apparatus having:
 a display assembly having a first end electronically coupled to the printed circuit board and a second end opposite the first end, and the display assembly including the deployable display; and a retraction assembly having:
 an accommodation assembly;
 a rotary member rotatably received in the accommodation assembly;
 a driving assembly coupled to the rotary member and the accommodation assembly; and
 a latching member for selectively locking the rotary member to the accommodation assembly;
 wherein, the second end of the display assembly is coupled to the rotary member and the display assembly is rotatably stored around the rotary member within the accommodation assembly when the accommodation assembly is positioned near the electronic device housing;
 wherein, when the accommodation assembly is moved away from the electronic device housing, the rotary member rotates in a first direction relative the accommodation assembly to extend the deployable display from the accommodation assembly;
 wherein, when the rotary member rotates in the first direction relative the accommodation assembly, the driving assembly accumulates potential energy; and
 wherein, the accumulated potential energy of the driving assembly rotates the rotary member in a second direction to restore the display assembly around the rotary member within the accommodation assembly.

* * * * *